(12) United States Patent
Gordon

(10) Patent No.: US 7,676,107 B2
(45) Date of Patent: Mar. 9, 2010

(54) METHOD AND SYSTEM FOR VIDEO CLASSIFICATION

(75) Inventor: Stephen Gordon, North Andover, MA (US)

(73) Assignee: Broadcom Corporation, Irvine, CA (US)

(*) Notice: Subject to any disclaimer, the term of this patent is extended or adjusted under 35 U.S.C. 154(b) by 996 days.

(21) Appl. No.: 11/405,303

(22) Filed: Apr. 17, 2006

(65) Prior Publication Data

US 2006/0256855 A1     Nov. 16, 2006

Related U.S. Application Data

(60) Provisional application No. 60/681,267, filed on May 16, 2005.

(51) Int. Cl.
*G06K 9/36*     (2006.01)
(52) U.S. Cl. ..................................................... 382/251
(58) Field of Classification Search ................. 382/162, 382/164–167, 232–233, 240, 251, 253; 348/386.1, 348/420.1, 421.1; 375/240.03, 240.22, 240.24
See application file for complete search history.

(56) References Cited

U.S. PATENT DOCUMENTS

| | | | | |
|---|---|---|---|---|
| 5,677,689 A | * | 10/1997 | Yovanof et al. | ............... 341/50 |
| 6,125,201 A | * | 9/2000 | Zador | ......................... 382/166 |
| 6,314,208 B1 | * | 11/2001 | Konstantinides et al. | .... 382/239 |
| 6,865,291 B1 | * | 3/2005 | Zador | ......................... 382/166 |

\* cited by examiner

*Primary Examiner*—Jose L Couso
(74) *Attorney, Agent, or Firm*—McAndrews Held & Malloy, Ltd.

(57) ABSTRACT

Described herein is a method and system for video classification. The method and system can use predetermined color ranges to classify a video block. On a relative basis, a greater number of bits can be allocated to perceptually important video data such as skin. The quantization is adjusted accordingly. Determining relative quantization shifts for macroblocks in a picture prior to video encoding enables a corresponding bit allocation that can improve the tradeoff between perceptual quality and bit rate.

14 Claims, 6 Drawing Sheets

METHOD AND SYSTEM FOR VIDEO CLASSIFICATION

RELATED APPLICATIONS

This application claims priority to and claims benefit from: U.S. Provisional Patent Application Ser. No. 60/681,267, entitled "METHOD AND SYSTEM FOR VIDEO CLASSIFICATION" and filed on May 16, 2005.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video communications systems are continually being enhanced to meet requirements such as reduced cost, reduced size, improved quality of service, and increased data rate. Many advanced processing techniques can be specified in a video compression standard, but the design of a compliant video encoder is not typically specified in the standard. Optimization of the communication system's requirements is dependent on the design of the video encoder, and an important aspect of the encoder design is rate control.

A video encoder that utilizes a constant quantization resolution for every block tends to under-allocate bits in areas that are well predicted and perceptually significant. While, a video encoder that uses the same number of bits for every macroblock tends to under-allocate bits to complex areas (high motion) such that a blocking artifact becomes noticeable. Rate control systems may attempt to choose a quantization level to balance between perceptually significance and complexity while maintaining the desired bit rate.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for rate control while encoding video data, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method are presented for video classification. Video may be classified in order to allocate more or fewer bits to blocks based on a perceptual quality.

Figure 1:
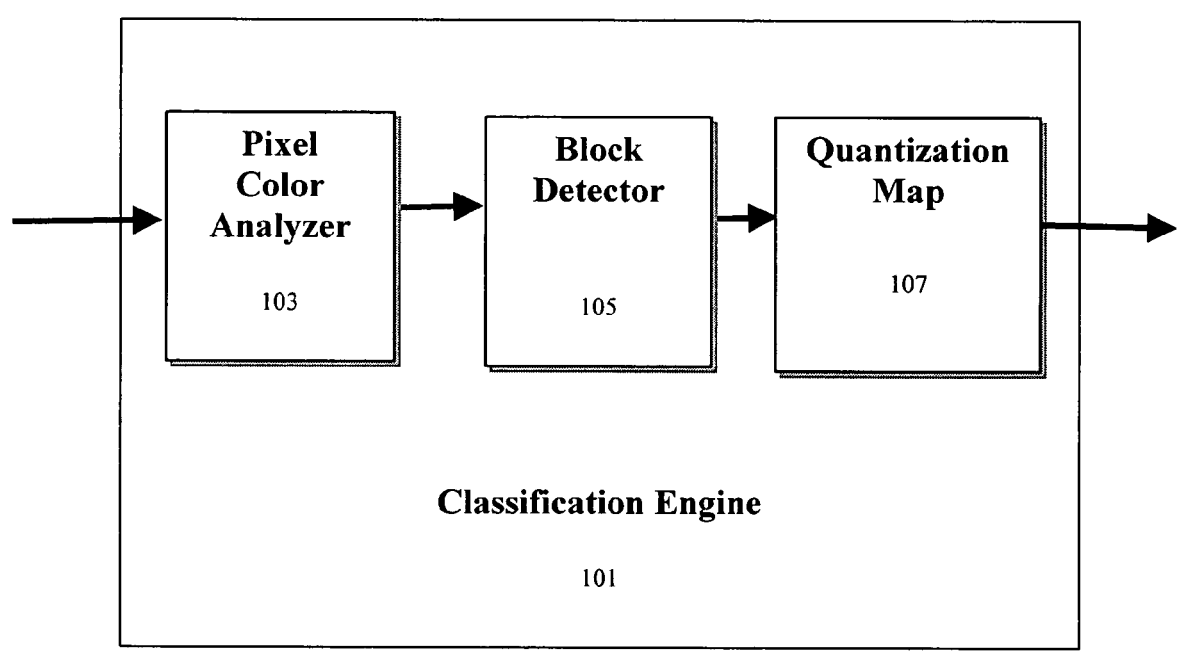
FIG. 1 is a block diagram of an exemplary system for video classification in accordance with an embodiment of the present invention.

Referring now to FIG. 1, a block diagram of an exemplary system for video classification is shown. The classification engine 101 comprises a color pixel analyzer 103, a block detector 105, and a quantization map 107. The color pixel analyzer 103 can determine whether the color components of a pixel in a current picture are within ranges associated with a target object.

Pixel color can be represented by different color spaces. For example, the RGB color space has three colors components (Red, Green, and Blue) that can be added together in various combinations to create any other color. Another color space, YUV, stores the color in the same way the human brain works. The primary visual aspect that the human brain acknowledges is brightness corresponding to the Luma (Y) component. Chromaticity is stored in the Chroma Blue (Cb or U) component and the Chroma Red (Cr or V) component. Each YUV component can be derived from a linear combination of RGB components. Likewise, each RGB component can be derived from a linear combination of YUV component.

Components R, G, B, and Y are typically described in text as having a range from 0 to 1, and components Cr and Cb are typically described as having a range from −0.5 to 0.5. In a digital picture, the color component levels are represented by a fixed number of bits. For example, 8-bit color will represent the color component ranges as 0 to 255. In the RGB color space, white can be 255,255,255 and black can be 0,0,0. In the YUV color space, white can be 255,128,128 and black can be 0,128,128.

For applications such as video conferencing, perceptual clarity of facial features is very important, so an example target object is skin. In the YUV space, the color pixel analyzer 103 can perform the following type of comparisons per pixel at location (x,y):

MinY<Y<MaxY
MinU<U<MaxU
MinV<V<MaxV
MinUV<U+V<MaxUV
MinYVU<U+Y−V<MaxYUV

If all of the inequalities are true then skin(x,y)=1 else skin(x,y)=0. The Min and Max values can be determined empirically.

Figure 2:
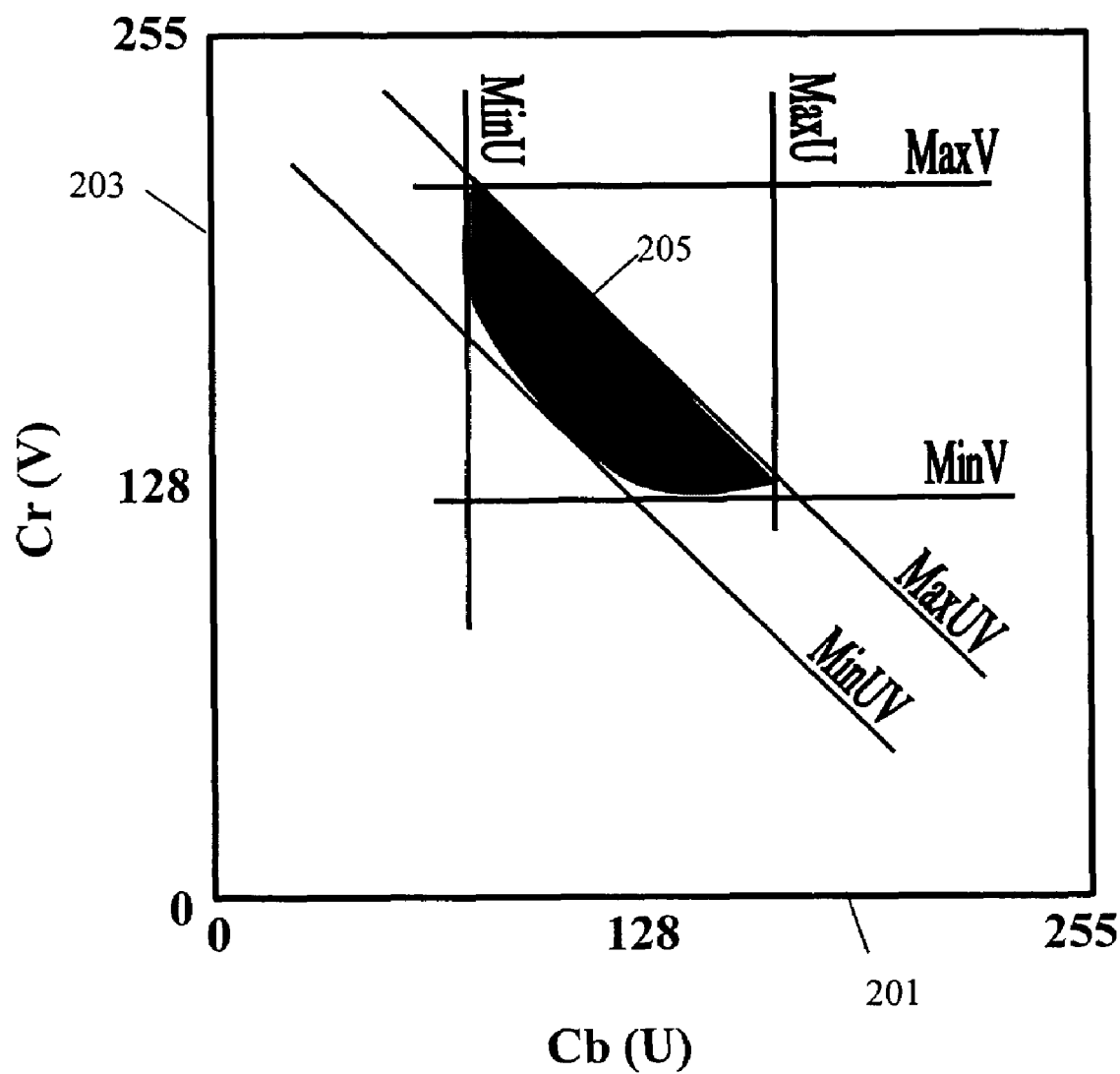
FIG. 2 is a plot of an exemplary chromaticity relationship that may be used by an exemplary system for video classification in accordance with an embodiment of the present invention.

As lighting conditions change, the Lumma (Y) component of a pixel associated with a target object may vary more than the U and V. Refer now to FIG. 2, a plot of chromaticity as U 201 vs. V 203 is shown. If the target object has been shown to produce a consistent chromaticity pattern 205 with different brightness levels the boundaries:

MinU<U<MaxU
MinV<V<MaxV
MinUV<U+V<MaxUV define a region in which a pixel can be classified.

Referring back to FIG. 1, a block of pixels can be declared part of a target region by the block detector 105 if enough of the pixels are classified as such. For example in an 8×8 block of pixels in which skin is being detected, the pixel-based decisions of 0 or 1 from the color pixel analyzer 103 can be summed. If the sum of skin(x+m, y+n) for m=0 to 7 and n=0 to 7 exceeds a predetermined threshold, then the block is classified as skin. Further aggregation to the macroblock level or greater is possible. For the case of skin detection, an allowance for non-skin fill-in may be required to get across eyes, eyebrows, etc.

When the block detector 105 has classified a target object, quantization levels can be adjusted to allocate more or less resolution to the associated block(s). For the case of skin detection, a finer resolution can be desired to enhance human features. The quantization parameter (QP) can be adjusted to change bit resolution at the quantizer in a video encoder. Shifting QP lower will add more bits and increase resolution. If the block detector 105 has detected a target object that is to be given higher resolution, the QP of the associated block in the quantization map 107 will decreased. If the block detector 105 has detected a target object that is to be given a lower resolution, the QP of the associated block in the quantization map 107 will increased. Target objects that can receive lower resolution may include trees, sky, clouds, or water if the detail in these objects is unimportant to the overall content of the picture.

The quantization map 107 can be generated a priori and can be used by a rate controller during the encoding of a picture. When coding the picture, a nominal QP will be adjusted to try to stay on a desired "rate profile", and the quantization map 107 can provide relative shifts to the nominal QP.

There can be other classification statistics that also affect the quantization map 107. Classification statistics may also include: motion estimation quality, spatial prediction quality, dynamic range of the intensity, and isolated edges.

Figure 3:
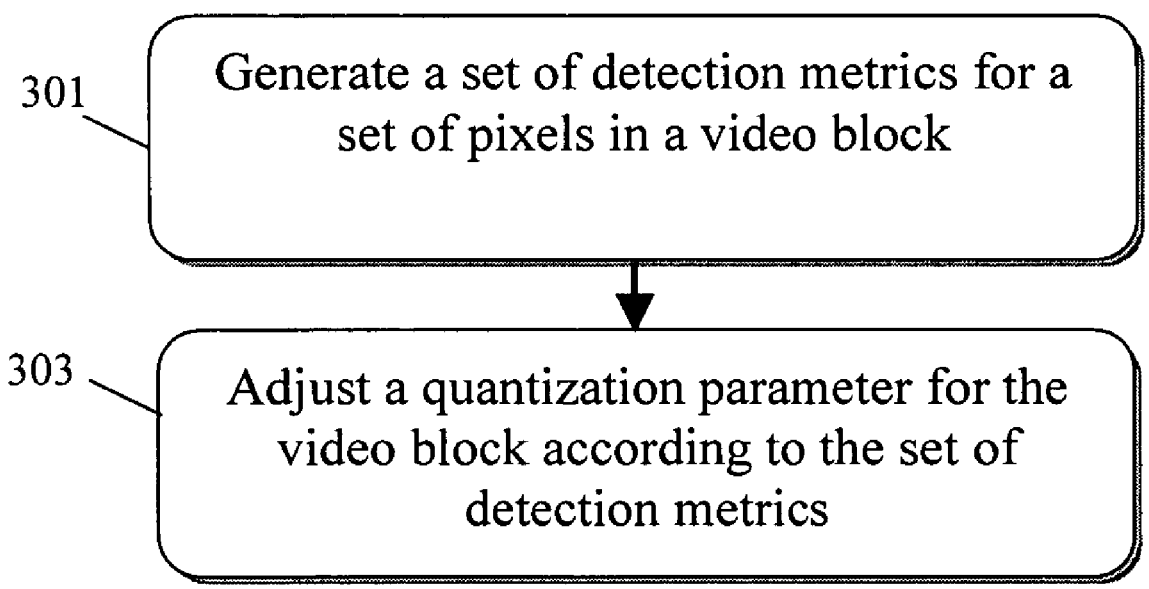
FIG. 3 is a flow diagram of an exemplary method for video classification in accordance with an embodiment of the present invention.

FIG. 3 is a flow diagram 300 of an exemplary method for video classification in accordance with an embodiment of the present invention. A set of detection metrics is generated for a set of pixels in a video block at 301. A detection metric is based on one or more color components of a pixel.

A quantization parameter for the video block is adjusted according to the set of detection metrics at 303. Rate control can be based on a mapping of quantization parameters to blocks in a picture. During encoding there can be a baseline quantization level, and the quantization map indicates a deviation from that baseline according to the classified perceptual quality.

This invention can be applied to video data encoded with a wide variety of standards, one of which is H.264. An overview of H.264 will now be given. A description of an exemplary system for scene change detection in H.264 will also be given.

H.264 Video Coding Standard

The ITU-T Video Coding Experts Group (VCEG) and the ISO/IEC Moving Picture Experts Group (MPEG) drafted a video coding standard titled ITU-T Recommendation H.264 and ISO/IEC MPEG-4 Advanced Video Coding, which is incorporated herein by reference for all purposes. In the H.264 standard, video is encoded on a macroblock-by-macroblock basis.

By using the H.264 compression standard, video can be compressed while preserving image quality through a combination of spatial, temporal, and spectral compression techniques. To achieve a given Quality of Service (QoS) within a small data bandwidth, video compression systems exploit the redundancies in video sources to de-correlate spatial, temporal, and spectral sample dependencies. Statistical redundancies that remain embedded in the video stream are distinguished through higher order correlations via entropy coders. Advanced entropy coders can take advantage of context modeling to adapt to changes in the source and achieve better compaction.

An H.264 encoder can generate three types of coded pictures: Intra-coded (I), Predictive (P), and Bidirectional (B) pictures. Each macroblock in an I picture is encoded independently of other pictures based on a transformation, quantization, and entropy coding. I pictures are referenced during the encoding of other picture types and are coded with the least amount of compression. Each macroblock in a P picture includes motion compensation with respect to another picture. Each macroblock in a B picture is interpolated and uses two reference pictures. The picture type I uses the exploitation of spatial redundancies while types P and B use exploitations of both spatial and temporal redundancies. Typically, I pictures require more bits than P pictures, and P pictures require more bits than B pictures.

Figure 4:
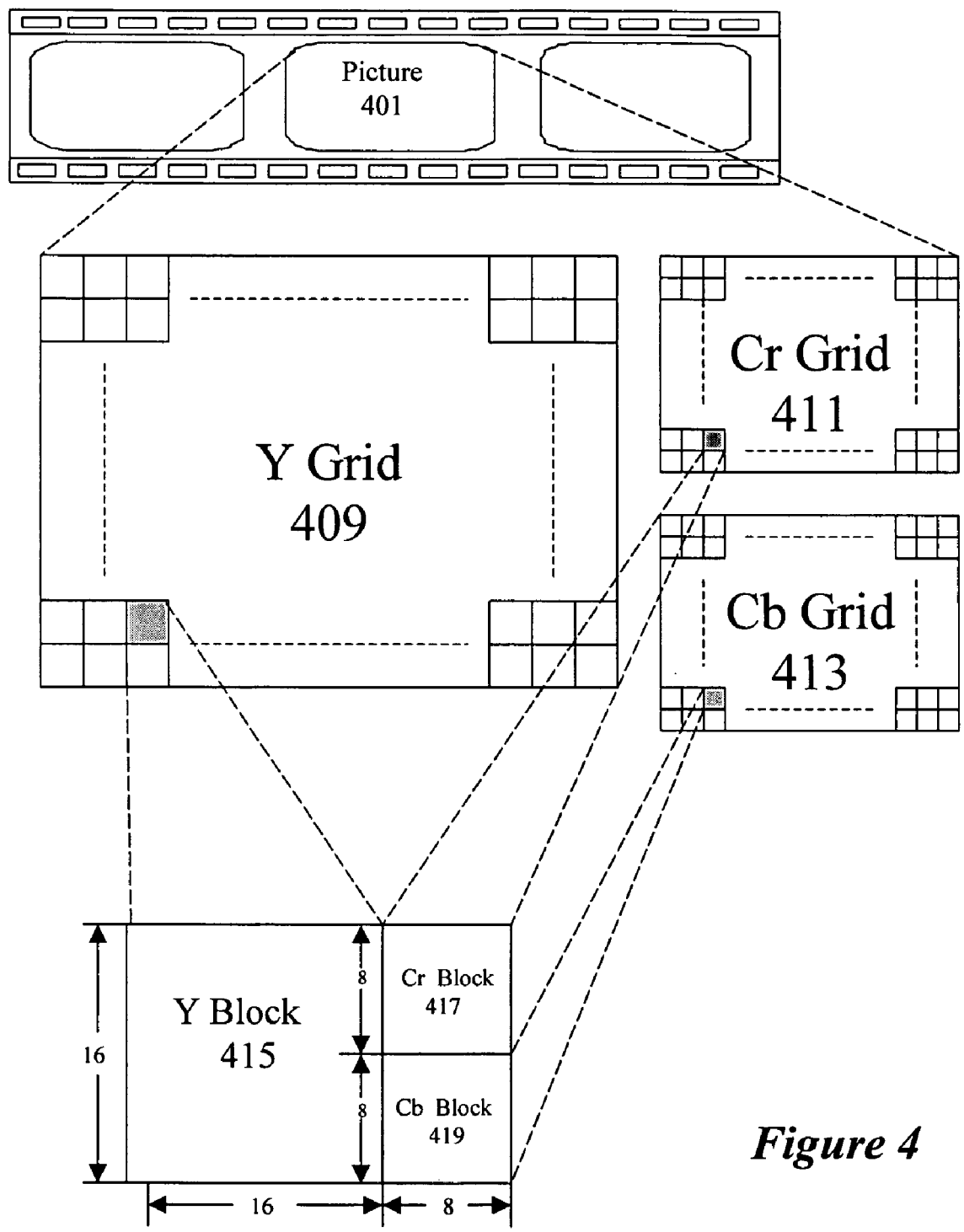
FIG. 4 is a block diagram of an exemplary picture in accordance with an embodiment of the present invention.

In FIG. 4 there is illustrated a diagram of an exemplary digital picture 401. The digital picture 401 comprises two-dimensional grid(s) of pixels. For color video, each color component is associated with a unique two-dimensional grid of pixels. For example, a picture can include luma, chroma red, and chroma blue components. Accordingly, these components can be associated with a luma grid 409, a chroma red grid 411, and a chroma blue grid 413. When the grids 409, 411, 413 are overlaid on a display device, the result is a picture of the field of view at the duration that the picture was captured.

Generally, the human eye is more perceptive to the luma characteristics of video, compared to the chroma red and chroma blue characteristics. Accordingly, there are more pixels in the luma grid 409 compared to the chroma red grid 411 and the chroma blue grid 413.

The luma grid 409. can be divided into 16×16 pixel blocks. For a luma block 415, there is a corresponding 8×8 chroma red block 417 in the chroma red grid 411 and a corresponding 8×8 chroma blue block 419 in the chroma blue grid 413. Blocks 415, 417, and 419 are collectively known as a macroblock.

The macroblocks are encoded using techniques that take advantage of temporal and spatial redundancies. The macroblocks are also converted from the pixel domain to the frequency domain. In the frequency domain, the macroblock is associated with frequency coefficients. The frequency coefficients are then quantized.

In certain embodiments of the present invention, the target areas can be macroblocks. A determination can be made whether the macroblock comprises skin, and the quantization step for the macroblock can be based on whether the macroblock comprises skin.

Figure 5:
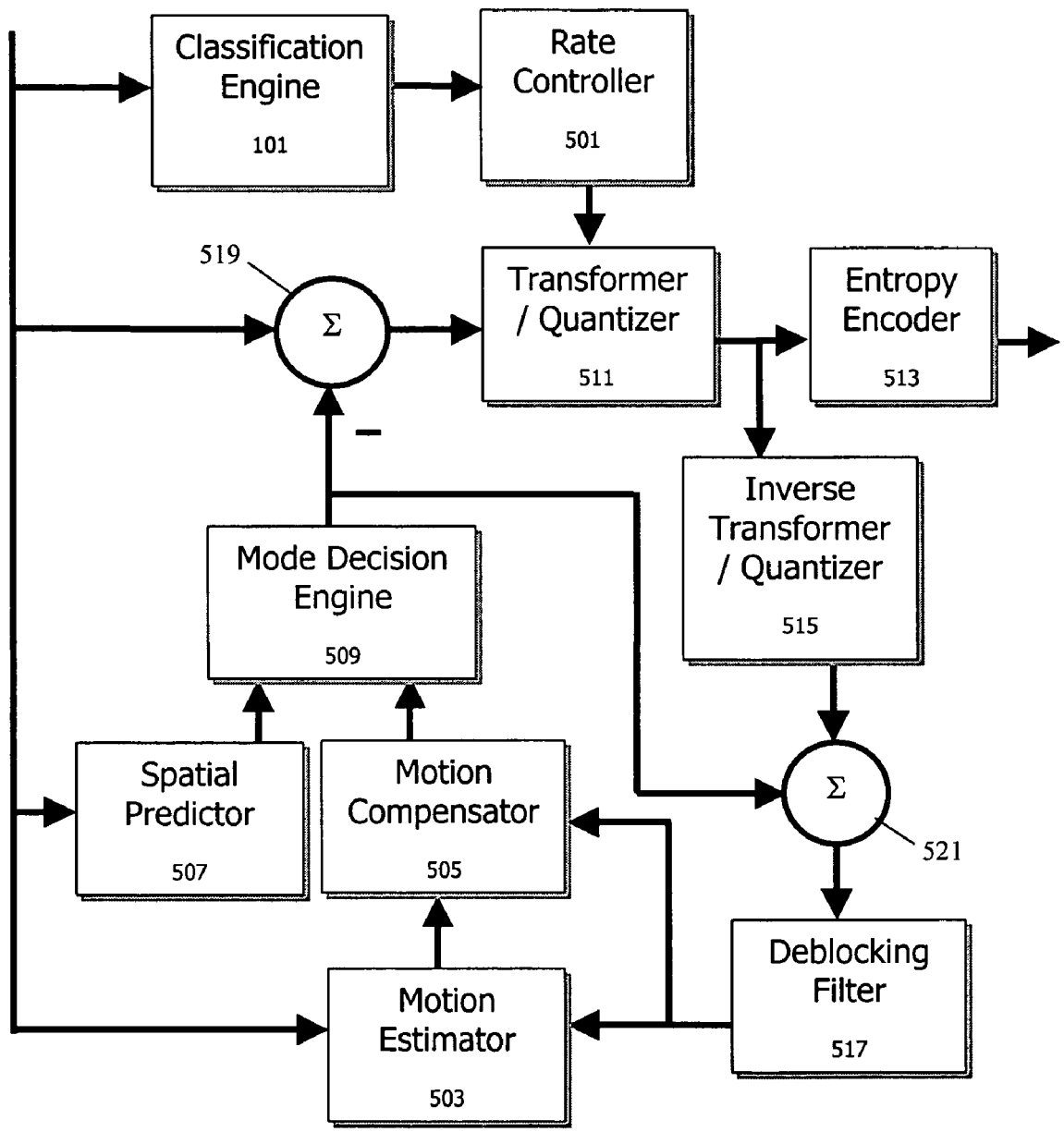
FIG. 5 is a block diagram of an exemplary video encoding system that comprises a system for video classification in accordance with an embodiment of the present invention.

Referring now to FIG. 5, there is illustrated a block diagram of an exemplary video encoder 500. The video encoder 500 comprises the classification engine 101 of FIG. 1, a rate controller 501, a motion estimator 503, a motion compensator 505, a spatial predictor 507, a mode decision engine 509, a transformer/quantizer 511, an entropy encoder 513, an inverse transformer/quantizer 515, and a deblocking filter 517.

The spatial predictor 507 uses the contents of a current picture for prediction. Spatially predicted partitions are intra-coded. Luma macroblocks can be divided into 4×4 or 16×16 partitions and chroma macroblocks can be divided into 8×8 partitions. 16×16 and 8×8 partitions each have 4 possible prediction modes, and 4×4 partitions have 9 possible prediction modes.

The motion estimator 503 generates motion vector that predicts the partitions in the current picture from reference partitions out of the deblocking filter 517. A temporally encoded macroblock can be divided into 16×8, 8×16, 8×8, 4×8, 8×4, or 4×4 partitions. Each partition of a 16×16 macroblock is compared to one or more prediction blocks in previously encoded picture that may be temporally located before or after the current picture.

The motion compensator 505 receives the motion vectors from the motion estimator 503 and generates a temporal prediction. Motion compensation runs along with the main encoding loop to allow intra-prediction macroblock pipelining.

The mode decision engine 509 ill receive the spatial prediction and temporal prediction and select the prediction mode according to a sum of absolute transformed difference (SATD) cost that optimizes rate and distortion. A selected prediction is output.

Once the mode is selected, a corresponding prediction error is the difference 519 between the current picture and the selected prediction. The transformer/quantizer 511 transforms the prediction error and produces quantized transform coefficients.

Transformation in H.264 utilizes Adaptive Block-size Transforms (ABT). The block size used for transform coding of the prediction error corresponds to the block size used for prediction. The prediction error is transformed independently of the block mode by means of a low-complexity 4×4 matrix that together with an appropriate scaling in the quantization stage approximates the 4×4 Discrete Cosine Transform (DCT). The Transform is applied in both horizontal and vertical directions. When a macroblock is encoded as intra 16×16, the DC coefficients of all 16 4×4 blocks are further transformed with a 4×4 Hardamard Transform.

Quantization in H.264 utilizes 52 quantization parameters (QP) that specify 52 different quantization step sizes. A lower QP corresponds to a smaller step size and finer resolution. The classification engine 101, as described in FIG. 1, may operate ahead of the rest of the video encoder 500 to produce an a priori quantization map. During the encoding process, the rate controller 501 will adjust a nominal QP level to maintain a specified bit rate profile. The quantization map will indicate relative shifts in QP for regions of video that have been classified as having a higher or lower perceptual importance.

H.264 specifies two types of entropy coding: Context-based Adaptive Binary Arithmetic Coding (CABAC) and Context-based Adaptive Variable-Length Coding (CAVLC). The entropy encoder 513 receives the quantized transform coefficients and produces a video output. In the case of temporal prediction, a set of picture reference indices may be entropy encoded as well.

The quantized transform coefficients are also fed into an inverse transformer/quantizer 515 to produce a regenerated error. The selected prediction and the regenerated error are summed 521 to regenerate a reference picture that is passed through the deblocking filter 517 and used for motion estimation.

Figure 6:
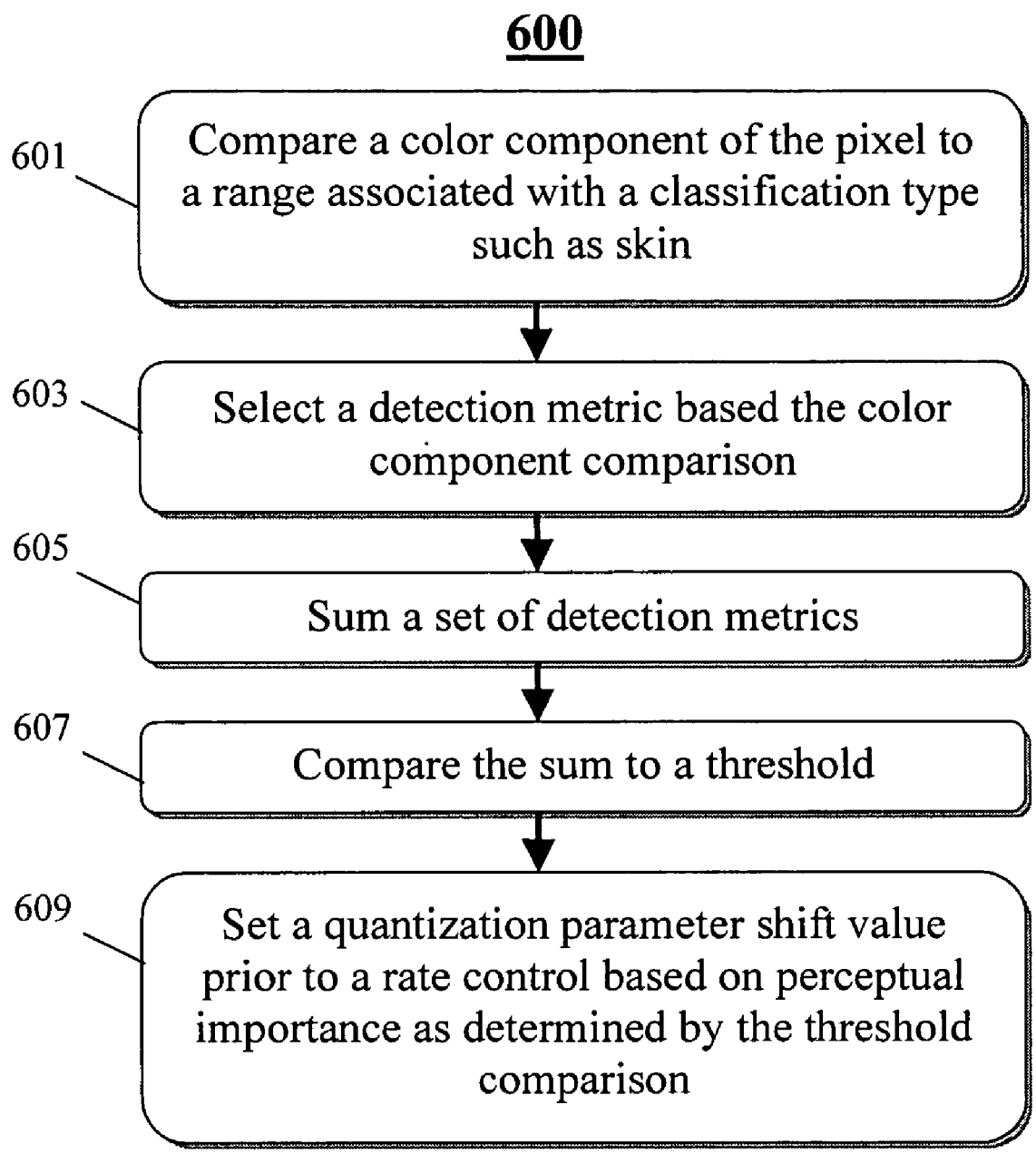
FIG. 6 is a flow diagram of another exemplary method for video classification in accordance with an embodiment of the present invention.

FIG. 6 is a flow diagram 600 of another exemplary method for video classification in accordance with an embodiment of the present invention. In 601, a color component of the pixel is compared to a range associated with a classification type such as skin. In 603, a detection metric is selected based the color component comparison of 601. In 605, a set of detection metrics is summed. In 607, the sum is compared to a predetermined threshold. In 609, a quantization parameter shift value is set prior to a rate control based on perceptual importance as determined by the threshold comparison in 607.

The embodiments described herein may be implemented as a board level product, as a single chip, application specific integrated circuit (ASIC), or with varying levels of a video classification circuit integrated with other portions of the system as separate components. An integrated circuit may store a supplemental unit in memory and use an arithmetic logic to encode, detect, and format the video output.

The degree of integration of the rate control circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on one encoding standard, the invention can be applied to a wide variety of standards.

Therefore, it is intended that the present invention not be limited. to the particular embodiment disclosed, but that the present invention will include all embodiments falling within the scope of the appended claims.

The invention claimed is:

1. A method for video classification, said method comprising:
   generating a set of detection metrics for a set of pixels in a video block, wherein a detection metric is based on one or more color components of a pixel by a circuit;
   adjusting a quantization parameter for the video block according to the set of detection metrics, wherein generating a set of detection metrics further comprises:
   comparing a color component of the pixel to a range associated with a classification type; and
   selecting the detection metric based the comparison;
   wherein the classification type is a presence of skin in the video block.

2. The method of claim 1, wherein adjusting a quantization parameter further comprises:
   summing the set of detection metrics; and
   comparing the sum to a threshold.

3. The method of claim 1, wherein adjusting a quantization parameter further comprises:
   setting a quantization parameter shift value prior to a rate control.

4. The method of claim 3, wherein a quantization parameter shift value is reduced to allocate a larger number of bits to a portion of a picture when a classification type is associated with perceptual importance.

5. The method of claim 3, wherein a quantization parameter shift value is increased to allocate a fewer number of bits to a portion of a picture when a classification type is not associated with perceptual importance.

6. A system for video classification in a video encoder, said system comprising:
- an integrated circuit for analyzing one or more color values associated with a block of pixels;
- a memory for storing a quantization map, wherein the quantization map is adjusted according to the analysis;
- a first circuit for assigning a combination of one or more color components of a pixel in said set of pixels to a range associated with a classification type, wherein the classification type is a skin detection; and
- a second circuit for setting a detection metric based the comparison.

7. The system of claim 6, wherein the integrated circuit further comprises:
- summing the set of detection metrics; and
- comparing the sum to a threshold to declare a detection of the classification type.

8. The system of claim 6, wherein a value in the quantization map is decreased to allocate a larger number of bits to a portion of a picture when a classification type is associated with perceptual importance.

9. The system of claim 6, wherein a value in the quantization map is increased to allocate a fewer number of bits to a portion of a picture when a classification type is not associated with perceptual importance.

10. An article of manufacture comprising:
- a computer readable medium storing a plurality of execution instructions, wherein the plurality of execution instructions comprises instructions for:
  - generating a set of detection metrics for a set of pixels in a video block, wherein a detection metric is based on one or more color components of a pixel by a circuit; and
  - adjusting a quantization parameter for the video block according to the set of detection metrics,
  - wherein generating a set of detection metrics further comprises:
    - comparing a color component of the pixel to a range associated with a classification type; and
    - selecting the detection metric based the comparison;
  - wherein the classification type is a presence of skin in the video block.

11. The article of manufacture of claim 10, wherein the plurality of instructions further comprises instructions for:
- summing the set of detection metrics; and
- comparing the sum to a threshold.

12. The article of manufacture of claim 10, wherein adjusting a quantization parameter further comprises:
- setting a quantization parameter shift value prior to a rate control.

13. The article of manufacture of claim 12, wherein a quantization parameter shift value is reduced to allocate a larger number of bits to a portion of a picture when a classification type is associated with perceptual importance.

14. The article of manufacture of claim 12, wherein a quantization parameter shift value is increased to allocate a fewer number of bits to a portion of a picture when a classification type is not associated with perceptual importance.

* * * * *